(12) United States Patent
Chai et al.

(10) Patent No.: US 10,009,843 B2
(45) Date of Patent: *Jun. 26, 2018

(54) METHOD AND APPARATUS FOR MEASURING CARRIER IN DEACTIVATED STATE

(71) Applicant: Huawei Technologies Co., Ltd., Shenzhen (CN)

(72) Inventors: Li Chai, Beijing (CN); Yuhua Chen, Shenzhen (CN); Miao Zhang, Shenzhen (CN); Weiwei Song, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 196 days.

This patent is subject to a terminal disclaimer.

(21) Appl. No.: 14/695,889

(22) Filed: Apr. 24, 2015

(65) Prior Publication Data

US 2015/0230178 A1 Aug. 13, 2015

Related U.S. Application Data

(63) Continuation of application No. 13/664,174, filed on Oct. 30, 2012, now Pat. No. 9,031,595, which is a (Continued)

(30) Foreign Application Priority Data

Apr. 30, 2010 (CN) .......................... 2010 1 0169441

(51) Int. Cl.
*H04W 4/00* (2009.01)
*H04W 52/02* (2009.01)
(Continued)

(52) U.S. Cl.
CPC ...... *H04W 52/0225* (2013.01); *H04B 17/327* (2015.01); *H04B 17/391* (2015.01);
(Continued)

(58) Field of Classification Search
USPC ....... 370/235, 252, 331, 332, 389, 465, 474, 370/230, 330, 338, 392, 443; 455/509, (Continued)

(56) References Cited

U.S. PATENT DOCUMENTS 6,208,858 B1 * 3/2001 Antonio ............. H04B 7/18534
370/331
7,693,054 B2 4/2010 Liu
(Continued)

FOREIGN PATENT DOCUMENTS

| CN | 1725869 A | 1/2006 |
|---|---|---|
| CN | 101189903 A | 5/2008 |

(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification(Release 9)," 3GPP TS 36.331, V9.2.0, $3^{rd}$ Generation Partnership Project, Valbonne, France (Mar. 2010).
(Continued)

*Primary Examiner* — Phuongchau Ba Nguyen
(74) *Attorney, Agent, or Firm* — Leydig, Voit & Mayer, Ltd.

(57) ABSTRACT

A method for measuring a carrier in deactivated state is provided in this invention, comprising receiving a configuration mode that does not take effect immediately by a user terminal UE; if a deactivation control signaling for a carrier is received by the UE or if a carrier timer of the UE expires, switching the carrier from activated state to deactivated
(Continued)

state, and measuring the carrier in deactivated state by the UE; or if an activation control signaling for a carrier in deactivated state that is being measured is received by the UE, terminating measurement of the carrier in deactivated state by the UE. Through controllable deactivated carrier measurement, the UE reduces battery power consumption and improves system performance. This invention also discloses an apparatus for measuring a carrier in deactivated state and a base station.

20 Claims, 10 Drawing Sheets

Related U.S. Application Data continuation of application No. PCT/CN2011/073593, filed on May 3, 2011.

(51) Int. Cl.
| | | |
|---|---|---|
| *H04W 52/28* | (2009.01) | |
| *H04B 17/327* | (2015.01) | |
| *H04B 17/391* | (2015.01) | |
| *H04W 24/02* | (2009.01) | |
| *H04W 72/04* | (2009.01) | |

(52) U.S. Cl.
CPC ....... *H04W 24/02* (2013.01); *H04W 52/0222* (2013.01); *H04W 52/0229* (2013.01); *H04W 52/287* (2013.01); *H04W 72/0453* (2013.01); *H04W 52/028* (2013.01); *H04W 52/0219* (2013.01); *Y02D 70/00* (2018.01); *Y02D 70/1262* (2018.01)

(58) Field of Classification Search
USPC .......... 455/67.11, 456.2, 523, 555, 437, 424, 455/439, 442, 12.1, 13.1, 13.3, 67.1, 423, 455/134, 135
See application file for complete search history.

(56) References Cited

U.S. PATENT DOCUMENTS

| | | | | |
|---|---|---|---|---|
| 7,792,034 | B2* | 9/2010 | Prodan | H04L 12/2801 370/235 |
| 9,031,595 | B2* | 5/2015 | Chai | H04W 52/287 455/456.2 |
| 2002/0190725 | A1 | 12/2002 | Craven | |
| 2003/0224772 | A1 | 12/2003 | Patzer et al. | |
| 2006/0223533 | A1 | 10/2006 | Sakata | |
| 2006/0281465 | A1 | 12/2006 | McBeath et al. | |
| 2007/0098007 | A1* | 5/2007 | Prodan | H04L 12/2801 370/443 |
| 2011/0007681 | A1 | 1/2011 | Park et al. | |
| 2011/0053658 | A1 | 3/2011 | Park et al. | |

FOREIGN PATENT DOCUMENTS

| | | |
|---|---|---|
| CN | 101635939 A | 1/2010 |
| CN | 101841823 A | 9/2010 |
| WO | WO 2011041662 A1 | 4/2011 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification(Release 9)," 3GPP TS 36.321 V9.2.0 $3^{rd}$ Generation Partnership Project, Valbonne, France (Mar. 2010).
"3rd Generation Partnership Project; Technical Specification Group Radio Access Network; Evolved Universal Terrestrial Radio Access (E-UTRA); Requirements for support of radio resource management(Release 9)," 3GPP TS 36.133 V9.3.0 $3^{rd}$ Generation Partnership Project, Valbonne, France (Mar. 2010).
"R2-100280—Analysis on Carrier Activation and De-activation," 3GPP TSG-RAN WG2 Meeting #68bis, Jan. 18-22, 2010, 3GPP, Valbonne, France.
"R2-101021—Measurements on Deactivated CC," 3GPP TSG RAN WG2 Meeting #69, Feb. 22-26, 2010, 3GPP, Valbonne, France.
"R2-101076—Explicit Activation and Deactivation," 3GPP TSG RAN WG2 Meeting #69, Feb. 22-26, 2010, 3GPP, Valbonne, France.
"R2-101150—Discussion on CC Activation and Deactivation," 3GPP TSG RAN WG2 Meeting #69, Feb. 22-26, 2010, 3GPP, Valbonne, France.
"R2-101492—CC Activation/Deactivation Details," 3GPP TSG RAN WG2 Meeting #69, Feb. 22-26, 2010, 3GPP, Valbonne, France.
"R4-101375—Further Discussion on Measurement in CA," 3GPP TSG-RAN WG4 Meeting Ad Hoc 2010 #02, Apr. 12-16, 2010, 3GPP, Valbonne, France.
Notice of Allowance in corresponding U.S. Appl. No. 13/664,174 (dated Jan. 14, 2015).
"Need for measurement gaps with carrier aggregation," 3GPP TSG-RAN WG4 Ad hoc meeting #10-02, Dublin, Ireland R4-101386, 3rd Generation Partnership Project, Valbonne, France (Apr. 12-16, 2010).
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.3.0, pp. 1-166, 3rd Generation Partnership Project, Valbonne, France (Mar. 2010).

* cited by examiner

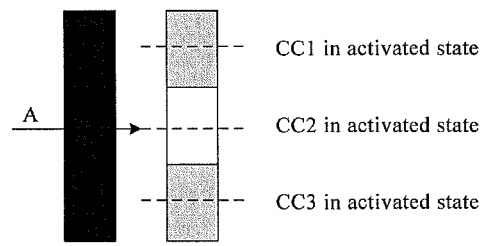
Fig. 4a1
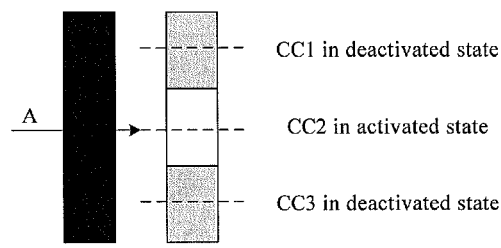
Fig. 4a2
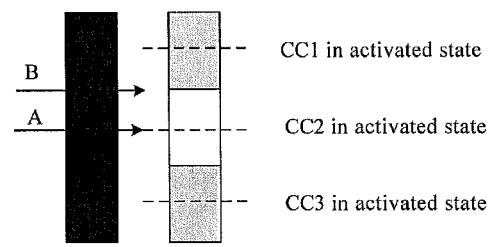
Fig. 4a3

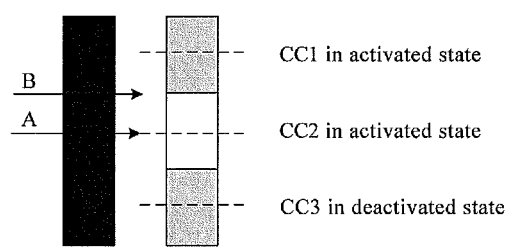
Fig. 4a4
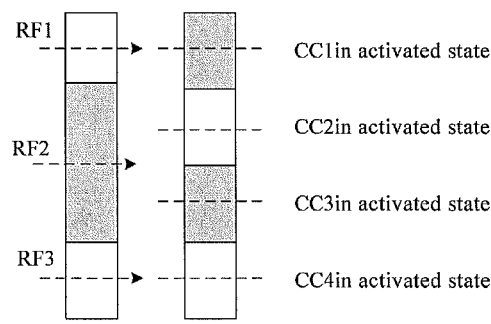
Fig. 4a5

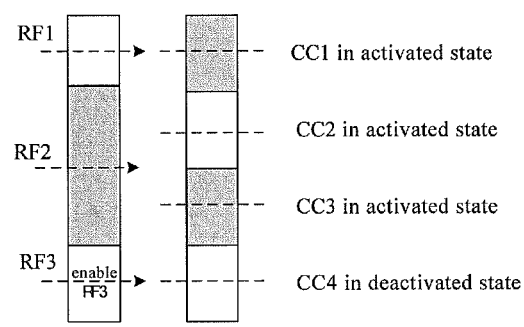
Fig. 4a6
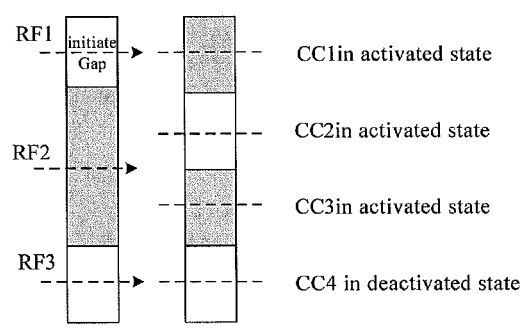
Fig. 4a7

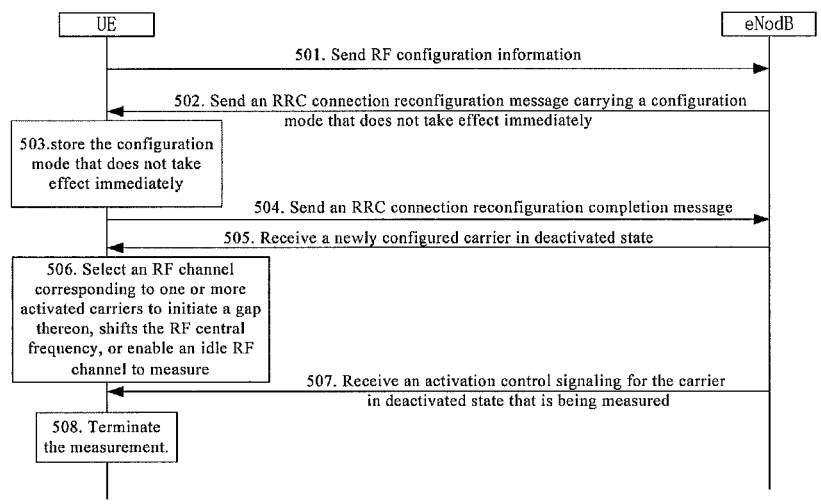
Fig. 5
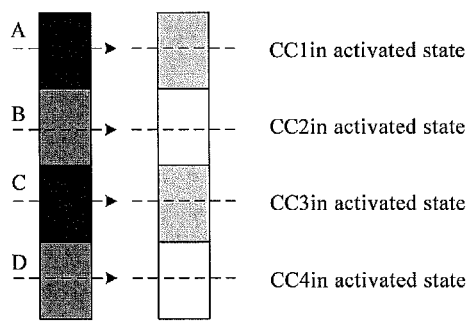
Fig. 5a1

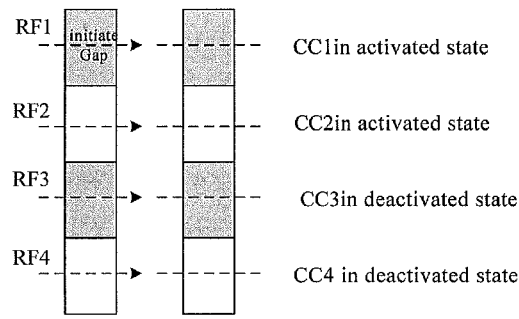
Fig. 5a2
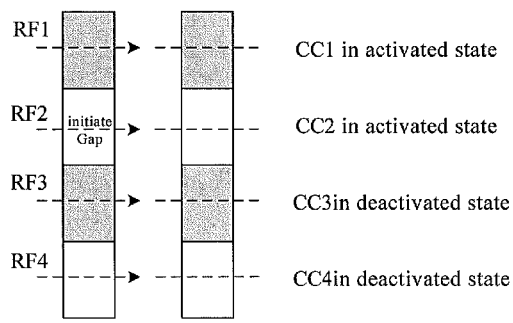
Fig. 5a3
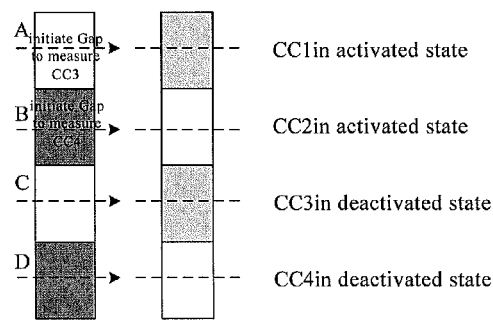
Fig. 5a4

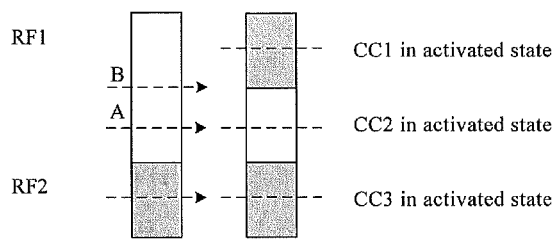
Fig. 5a5
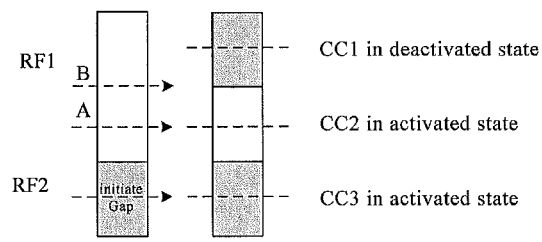
Fig. 5a6
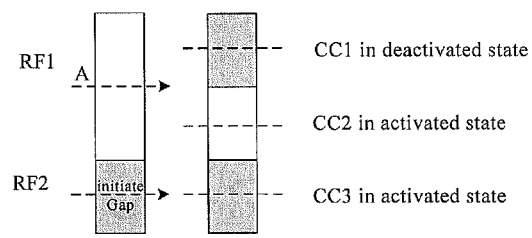
Fig. 5a7
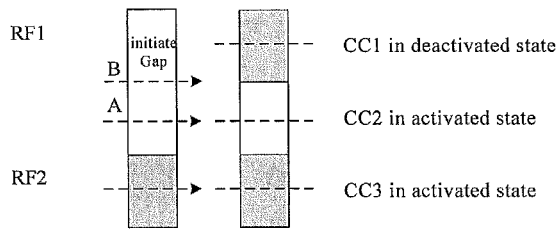
Fig. 5a8

METHOD AND APPARATUS FOR MEASURING CARRIER IN DEACTIVATED STATE

CROSS-REFERENCE TO RELATED APPLICATIONS

This application is a continuation of U.S. patent application Ser. No. 13/664,174, filed Oct. 30, 2012, which is a continuation of International Patent Application No. PCT/CN2011/073593, filed May 3, 2011. The International Patent Application claims priority to Chinese Patent Application No. 201010169441.6, filed Apr. 30, 2010. The afore-mentioned patent applications are hereby incorporated by reference in their entireties.

TECHNICAL FIELD

The present invention relates to the field of wireless communication technology, and more specifically, to a method and apparatus for measuring a carrier in deactivated state.

DESCRIPTION OF THE RELATED ART

In the carrier aggregation technique of Long Term Evolution Advance (Long Term Evolution, LTE-Advance), carrier activation and deactivation mechanisms are widely applied to packet service, File Transfer Protocol (File Transfer Protocol, FTP) and the like, wherein arrival of data packets of those services has burst and amount of those data packets is large. Thus, when UE sends/receives data to/from Base Station through activated carrier, the UE has to monitor Physical Downlink Control Channel (Physical Downlink Control Channel, PDCCH) for all carriers kept in activated state. However, continuously monitoring all activated carriers leads to high battery power consumption of the UE. In order to reduce UE battery power consumption, UE can activate carriers required to transmit data only upon the arrival of data packets, and only use a few carriers to keep activated when no data arrives or only a small amount of data arrives.

In order to guarantee success ratio for activating carriers required for data transmission, avoid data loss and interruption, it is necessary for the BS to measure and acquire signal quality and interference level of carriers in deactivated state before activating those deactivated carriers. However, highly frequent and highly precise measurement may consume battery power of terminals, which degrades system performance.

SUMMARY OF THE INVENTION

A method for measuring a carrier in deactivated state which is capable of improving system performance, is provided in an embodiment of this invention.

On one aspect, a method for measuring a carrier in deactivated state is provided, comprising:

receiving a configuration mode that does not take effect immediately by a user terminal UE;

if a deactivation control signaling for a carrier is received by the UE or if a carrier timer of said UE expires, then switching the carrier from activated state to deactivated state, and measuring the carrier in deactivated state by the UE; or if an activation control signaling for a carrier in deactivated state that is being measured is received by the UE, then terminating measurement of the carrier in deactivated state by the UE.

On another aspect, another method for measuring a carrier in deactivated state is provided, comprising:

sending a configuration mode that does not take effect immediately by a base station;

sending an activation control signaling from the base station to a UE, to cause a carrier to switch from activated state to deactivated state when the UE receiving deactivation control signaling for the carrier, and measuring the carrier in deactivated state by said UE; or sending an activation control signaling for a carrier in deactivated state that is being measured from the base station to the UE, to cause the UE to terminate measurement of the carrier in deactivated state.

On another aspect, an apparatus for measuring a carrier in deactivated state is provided, comprising:

a first receiving module, configured to receive a configuration mode that does not take effect immediately;

a second receiving module, configured to receive a deactivation control signaling for a carrier or a timeout notification of a carrier timer, or receive an activation control signaling for a carrier in deactivated state that is being measured;

a process module, configured to, when a deactivation control signaling or a timeout notification is received by the second receiving module, switch the carrier from activated state to deactivated state, and measure the carrier in deactivated state; or when an activation control signaling for a carrier in deactivated state is received by the second receiving module, terminate measurement of the carrier in deactivated state.

On another aspect, a base station is provided, comprising:

a first sending module, configured to send a configuration mode that does not take effect immediately;

a second sending module, configured to send a deactivation control signaling to UE to cause a carrier to switch from activated state to deactivated state when the UE receiving the deactivation control signaling for the carrier, and to cause the UE to measure the carrier in deactivated state; or for sending to the UE an activation control signaling for a carrier in deactivated state that is being measured, to cause the UE to terminate measurement of the carrier in deactivated state.

In embodiments of this invention, a user terminal UE receives a configuration mode that does not take effect immediately; if a deactivation control signaling for a carrier is received by the UE or if a carrier timer of the UE expires, the carrier is switched from activated state to deactivated state, and the UE measures the carrier in deactivated state; or if an activation control signaling for a carrier in deactivated state that is being measured is received by the UE, then the UE terminates measurement of the carrier in deactivated state. Through enhancing controllability of deactivated carrier measurement, the UE can reduce terminal battery power consumption and improve system performance.

BRIEF DESCRIPTION OF THE DRAWINGS

For a more explicit description of the technical solutions of embodiments of this invention, a brief introduction of accompanying drawings to be used in the description of these embodiments will be given below. Obviously, accompanying drawings described below are merely some embodi

FIG. 4a1 is a schematic diagram of a carrier configuration of an embodiment of this invention;

FIG. 4a2 is a schematic diagram of measuring a carrier in deactivated state of an embodiment of this invention;

FIG. 4a3 is a schematic diagram of another carrier configuration of an embodiment of this invention;

FIG. 4a4 is another schematic diagram of measuring a carrier in deactivated state of an embodiment of this invention;

FIG. 4a5 is a schematic diagram of another carrier configuration of an embodiment of this invention;

FIG. 4a6 is another schematic diagram of measuring a carrier in deactivated state of an embodiment of this invention;

FIG. 4a7 is another schematic diagram of measuring a carrier in deactivated state of an embodiment of this invention;

FIG. 5 is a schematic diagram of a flow of a method for measuring a carrier in deactivated state according to another embodiment of this invention;

FIG. 5a1 is a schematic diagram of a carrier configuration of an embodiment of this invention;

FIG. 5a2 is another schematic diagram of measuring a carrier in deactivated state of an embodiment of this invention;

FIG. 5a3 is another schematic diagram of measuring a carrier in deactivated state of an embodiment of this invention;

FIG. 5a4 is another schematic diagram of measuring a carrier in deactivated state of an embodiment of this invention;

FIG. 5a5 is a schematic diagram of a carrier configuration of an embodiment of this invention;

FIG. 5a6 is another schematic diagram of measuring a carrier in deactivated state of an embodiment of this invention;

FIG. 5a7 is another schematic diagram of measuring a carrier in deactivated state of an embodiment of this invention;

FIG. 5a8 is another schematic diagram of measuring a carrier in deactivated state of an embodiment of this invention;

FIG. 6 is a schematic diagram of a flow of a method for measuring a carrier in deactivated state according to another embodiment of this invention;

FIG. 7 is a schematic diagram of a flow of a method for measuring a carrier in deactivated state according to another embodiment of this invention;

FIG. 8 is a schematic structure diagram of an apparatus for measuring a carrier in deactivated state of this invention;

DETAILED DESCRIPTION OF THE PREFERRED EMBODIMENT

For making objects, technical solutions and advantages of embodiments of this invention more clear, description will be given below this invention in connection with accompanying drawings. Obviously, embodiments described herein are merely some embodiments of this invention, but not all of them. Based on those embodiments of this invention, other embodiments can occur to those skilled in the art without any creative efforts, all of which fall within the scope of this invention.

Figure 1:
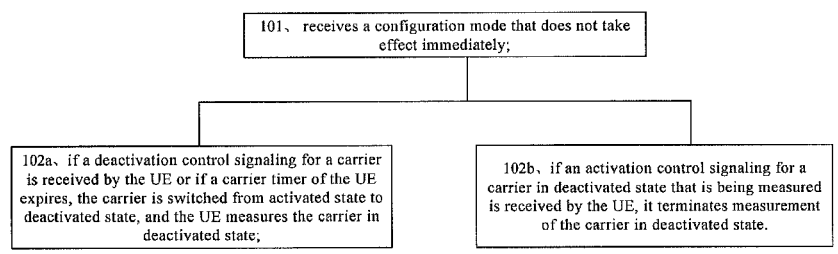
- FIG. 1 is a schematic diagram of a flow of a method for measuring a carrier in deactivated state according to an embodiment of this invention.

FIG. 1 is a schematic diagram of a flow of a method for measuring a carrier in deactivated state according to an embodiment of this invention, comprising the following steps:

101. A user terminal UE receives a configuration mode that does not take effect immediately;

102a. if a deactivation control signaling for a carrier is received by the UE or if a carrier timer of the UE expires, the carrier is switched from activated state to deactivated state, and the UE measures the carrier in deactivated state; or

102b. if an activation control signaling for a carrier in deactivated state that is being measured is received by the UE, then the UE terminates the measurement of the carrier in deactivated state.

In the embodiment of this invention, a user terminal UE receives a configuration mode that does not take effect immediately; if a deactivation control signaling for a carrier is received by the UE or if a carrier timer of the UE expires, then the carrier is switched from activated state to deactivated state, and the UE measures the carrier in deactivated state; or if an activation control signaling for a carrier in deactivated state that is being measured is received by the UE, then the UE terminates measurement of the carrier in deactivated state. Through controllable deactivated carrier measurement, the UE can reduce its terminal battery power consumption and improve system performance.

Figure 2:
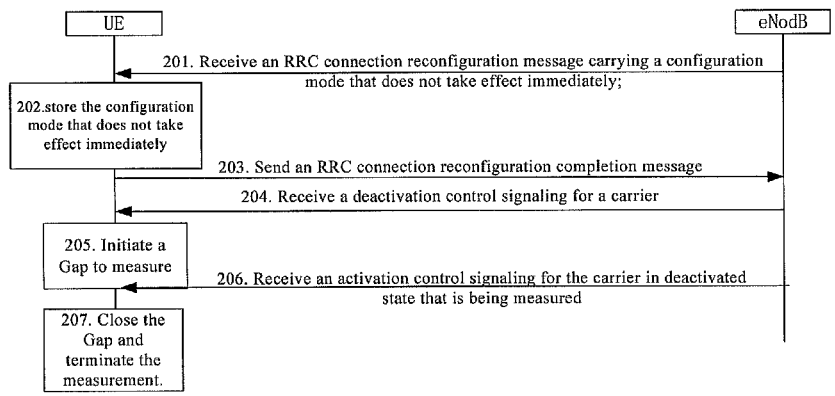
FIG. 2 is a schematic diagram of a flow of a method for measuring a carrier in deactivated state according to another embodiment of this invention.

FIG. 2 is a schematic diagram of a flow of an embodiment of method for measuring a carrier in deactivated state of this invention, in which a carrier is measured when it is in deactivated state, comprising the following steps:

201. UE receives an Radio Resource Control (Radio Resource Control, RRC) connection reconfiguration message sent from BS, wherein the configuration message carries a configuration mode that does not take effect immediately;

202. The UE stores the configuration mode that does not take effect immediately;

203. The UE sends to the BS an RRC connection reconfiguration completion message;

204. The UE receives a deactivation control signaling for a carrier sent from the BS, and switches the carrier from activated state to deactivated state;

At step 204, the UE can confirm to switch the carrier to deactivated state from activated state by timeout of an internal carrier timer.

The control signaling can be Medium Access Control (Medium Access Control, MAC) signaling or a physical layer control signaling.

205. The UE initiates a time slot Gap to measure the carrier in deactivated state;

206. The UE receives an activation control signaling sent from the BS for the carrier in deactivated state that is being measured;

207. The UE closes Gap and terminates measurement of the carrier in deactivated state.

After step 207, the UE initiates a gap again to perform deactivated carrier measurement only when a deactivation control signaling for the carrier in activated state is once again received by the UE from the BS.

In the embodiment of this invention, UE receives a configuration mode that does not take effect immediately, switches a carrier to deactivated state from activated state, initiates a gap to measure the carrier in deactivated state; if an activation control signaling for the carrier in deactivated state that is being measured is received by the UE, then the UE terminates measurement of the carrier in deactivated state. Through controllable deactivated carrier measurement of the UE, terminal battery power consumption can be reduced and system performance can be improved.

Figure 3:
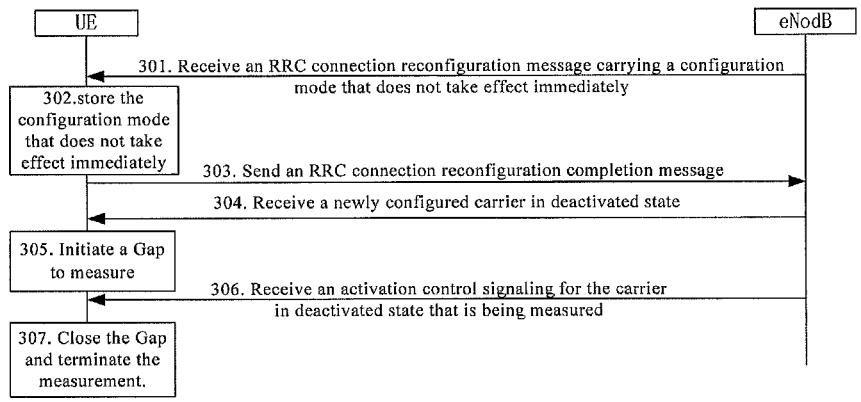
FIG. 3 is a schematic diagram of a flow of a method for measuring a carrier in deactivated state according to another embodiment of this invention.

FIG. 3 is a schematic diagram of a flow of a method for measuring a carrier in deactivated state according to another embodiment of this invention, which is similar to the embodiment shown in FIG. 2, except that the UE receives a newly configured carrier, which is a carrier newly configured by a BS for the UE. The newly configured carrier can be carrier in deactivated state or initial state, and then the UE initiates a gap to measure the carrier in deactivated state.

Figure 4:
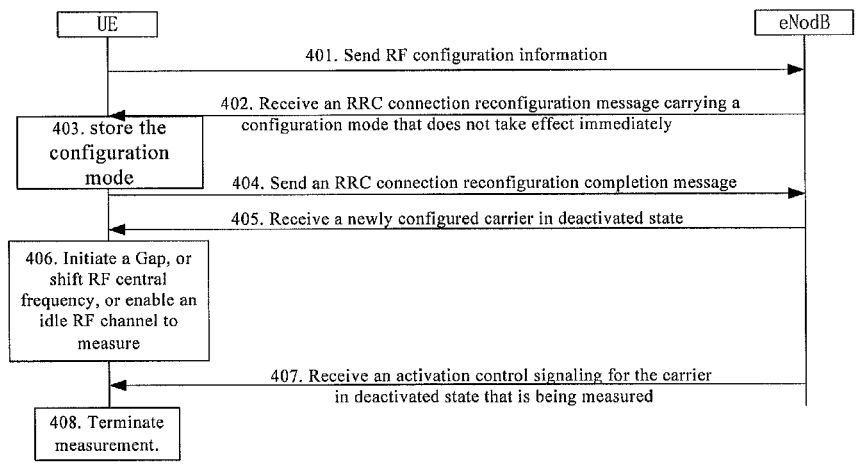
FIG. 4 is a schematic diagram of a flow of a method for measuring a carrier in deactivated state according to another embodiment of this invention.

FIG. 4 is a schematic diagram of a flow of a method for measuring a carrier in deactivated state according to another embodiment of this invention, in which if a carrier of the UE is in deactivated state, then the UE can measure the carrier in deactivated state through initiating a gap, shifting RF central frequency, or enabling an idle RF channel. The embodiment comprises the following steps:

401. The UE sends Radio Frequency (Radio Frequency, RF) capability information of the UE to a base station.

When the base station configures a new carrier for the UE, the UE sends RF capability in the band of the carrier only when there are at least two RF channels in the band.

Wherein, the UE sends its RF capability information in the same band to the base station, comprising:

sending, by the UE, its RF capability information in the same band to the base station. For example, the capability information can be UE-EUTRA-Capability, wherein the RF capability information can comprise a maximum number of RF channels that can be supported in the band and receiving bandwidth supported by each RF, wherein the receiving bandwidth can be a maximum receiving bandwidth.

If the receiving bandwidth of the RFs in the same band are same, then the RF capability information in the same band can only comprise number of RFs supported in the band.

The RF capability information in the band can further comprise receiving bandwidth supported in the band, the receiving bandwidth is a bandwidth in which the UE can receive data and/or measure bandwidth simultaneously when all RF channels are enabled, the receiving bandwidth and/or measurement bandwidth can be a maximum bandwidth.

402. The UE receives the RRC connection configuration message sent from the base station, wherein the configuration message carries a configuration mode that does not take effect immediately.

403. The UE stores the configuration mode.

404. A RRC connection reconfiguration completion message is sent to the base station.

405. The UE receives a deactivation control signaling for a carrier sent from the base station, and switches the carrier from activated state to deactivated state.

The control signaling may be Medium Access Control (Medium Access Control, MAC) signaling or a physical layer control signaling.

406. The UE measures the carrier in deactivated state through initiating a Gap, shifting RF central frequency, or enabling an idle RF channel.

The UE measuring the carrier in deactivated state through initiating a Gap, shifting the RF central frequency, or enabling an idle RF channel can be pre-configured. The pre-configuration can be configuration made by the base station based on the RF capability information reported by the UE, and then the BS can notify configuration information to the UE. The pre-configuration can comprise:

if each of configured carriers corresponds to an RF channel, then the UE receives a deactivated control signaling for a carrier, switches the carrier from activated state to deactivated state, initiates a gap on an enabled RF channel according to the RF capability of the UE to measure the carrier in deactivated state; or if each of configured carriers corresponds to a RF channel, then the UE receives a deactivated control signaling for a carrier, switches the carrier from activated state to deactivated state, enables a RF channel corresponding to the carrier in deactivated state according to the RF capability of the UE to perform measurement; or if at least two of configured carriers share a RF channel, then the UE receives a deactivated control signaling for a carrier, switches the carrier from activated state to deactivated state, shifts the central frequency of the RF channel according to the RF capability of the UE to measure the carrier in deactivated state; or if at least two of configured carriers share a RF channel, the UE receives a deactivated control signaling for a carrier, switches the carrier from activated state to deactivated state, and initiates a gap on an enabled RF channel according to the RF capability of the UE to measure the carrier in deactivated state.

An RF channel can cover multiple bands. When activated carriers and deactivated carriers are within the same band, particularly, when activated carriers and deactivated carriers are continuous carriers, the UE shifts a RF central frequency, that is, converts RF channel corresponding to activated carriers to a broader bandwidth of the deactivated carriers such that the bandwidth can ensure data reception of activated carriers and measurement of deactivated carriers to be performed simultaneously.

For example, as shown in FIG. 4a1, carriers CC1, CC2, CC3 are carriers in activated state, wherein the UE received a deactivation control signaling for CC1 and CC3. A is the RF central frequency. As shown in FIG. 4a2, the terminal can directly measure CC1 and CC3 without initiating a Gap.

As shown in FIG. 4a3, carriers CC1, CC2, CC3 are carriers in activated state, wherein the UE received a deactivation control signaling for CC3. A is the RF central frequency. As shown in FIG. 4a4, the UE shifts the RF central frequency to B, initiates a gap to measure CC3; or shifts the central frequency back to A to measure CC3.

Figure 6:
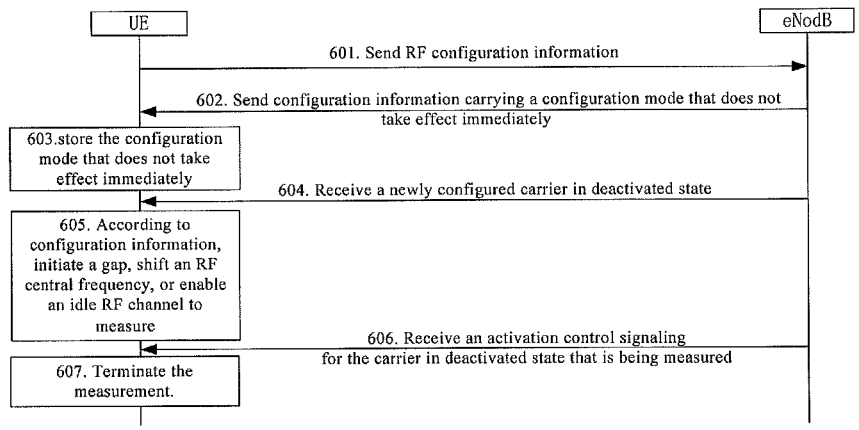
Figure 7:
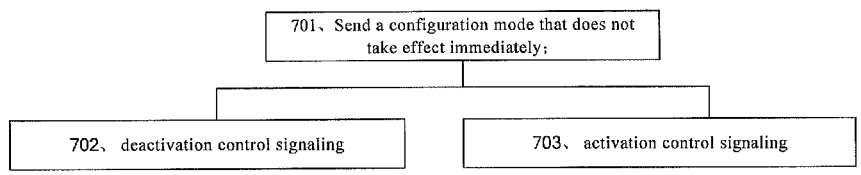

As shown in FIG. 4a5, carriers CC1, CC2, CC3, CC4 are carriers in activated state, wherein the UE received a deactivation control signaling for CC4. As shown in FIG. 4a6, RF3 is enabled to measure CC4; or as shown in FIG. 4a7, a Gap is initiated on RF1 to measure CC4.

407. The UE receives from the BS an activation control signaling for a carrier in deactivated state that is being measured.

408. The UE terminates measurement of the carrier in deactivated state.

At step 406, if the UE has initiated a Gap to measure the carrier in deactivated state, then the Gap has to be closed at first to terminate the measurement of the carrier in deactivated state; if the UE has shifted a central frequency to measure the carrier in deactivated state, then measurement of the carrier in deactivated state can be terminated directly; if the UE has enabled an idle RF channel to measure the carrier in deactivated state, then the UE must disable the idle RF channel and then terminate the measurement of the carrier in deactivated state.

With the embodiment of FIG. 4, the UE also can send a configuration mode that does not take effect immediately and RF capability information in carrier bands to the BS via a RRC connection reconfiguration completion message, so that the BS can be aware of timings at which the UE initiates and closes a gap based on the RF capability information and the configuration mode that does not take effect immediately of the UE, so that data and/or signaling transmission to the UE can be avoided when a gap is initiated by the UE, as a result, UE data and/or signaling loss can prevented.

In the embodiment of this invention, the UE receives a configuration mode that does not take effect immediately; when a deactivation control signaling for a carrier is received by the UE or when a carrier timer of the UE expires, the UE initiates a gap or shifts a central frequency or enable an idle RF channel to measure a carrier in deactivated state; if an activation control signaling for a carrier in deactivated state that is being measured is received by the UE, the UE terminates measurement of the carrier in deactivated state, so that through deactivated carrier measurement control, the UE can reduce terminal battery power consumption and improve system performance.

FIG. 5 is a schematic diagram of a flow of a method for measuring a carrier in deactivated state according to another embodiment of this invention, wherein UE selects a RF channel corresponding to one or more activated carriers to initiate a gap, or shifts RF central frequency, or selects an idle RF channel corresponding to one or more deactivated carriers to measure the carriers in deactivated state, comprising the following steps:

501. The UE sends RF capability information of the UE to a base station, when the base station configures a new carrier for the UE, the UE sends RF capability within a band of the new carrier to the BS only when there are at least two RF channels in the band, wherein, the UE sends RF capability information in the same band to the base station, comprising:

sending, by the UE, its RF capability information in the same band to the base station, for example, the capability information can be UE-EUTRA-Capability, wherein the RF capability information of the UE can comprise number of RF channels that can be supported in the band and receiving bandwidth supported by each RF channel, wherein the receiving bandwidth can be a maximum receiving bandwidth.

The RF capability in the band may further comprise receiving bandwidth supported in the band, the receiving bandwidth is a bandwidth in which the UE can receive data and/or measure bandwidth simultaneously when all RF channels are enabled. The receiving bandwidth and/or measurement bandwidth may be a maximum bandwidth.

If the RF capability in the same band supports the same receiving bandwidth, then the RF capability information in the same band can only comprise the number of RF channels supported in the band.

The RF capability in the band may further comprise receiving bandwidth supported in the band, that is, the receiving bandwidth is a bandwidth in which the UE can receive data and/or measure bandwidth simultaneously when all RF channels are enabled. The receiving bandwidth and/or measurement bandwidth may be a maximum bandwidth.

502. The UE receives an RRC connection configuration message sent from the base station, wherein a configuration message that does not take effect immediately is carried on the configuration message.

503. The UE stores the configuration mode that does not take effect immediately.

504. Sends an RRC connection reconfiguration completion message to the base station.

505. The UE receives a deactivation control signaling for a carrier sent from the base station, and switches the carrier from activated state to deactivated state.

Alternatively, when a carrier timer of the UE expires, the carrier is switched from activated state to deactivated state.

The control signaling can be Medium Access Control (Medium Access Control, MAC) signaling or a physical layer control signaling.

506. The UE selects an RF channel corresponding to one or more activated carriers to initiate a gap thereon, or shifts an RF central frequency, or selects an idle RF channel corresponding to one or more activated carriers to measure one or more deactivated carriers as selected objects.

The UE receives a deactivation control signaling for carriers, switches those carriers from activated state to deactivated state, and selects a RF channel corresponding to the one or more activated carriers to measure the carriers in deactivated state by measuring according to the RF capability of the UE, wherein during one measurement period, a non-repeated measurement is performed on at least one carrier in deactivated state on a RF channel corresponding to at least one carrier in activated state.

The measurement of deactivated carriers by the UE can be pre-configured by the BS and the UE. For example, as shown in FIG. 5a1, if carriers CC1, CC2, CC3, CC4 are carriers in activated state, when a deactivation control signaling for CC3 and CC4 is received by the UE, if the UE is going to measure CC3 and CC4, as shown in FIG. 5a2, the UE can initiate a gap on RF1 corresponding to CC1 to measure CC3 and CC4; as shown in FIG. 5a3, the UE also can initiate a gap on RF2 corresponding to CC2 to measure CC3 and CC4; as shown in FIG. 5a4, the UE also can initiate a gap on RF1 to measure CC3 and initiate a gap on RF2 to measure CC4.

Figure 8:
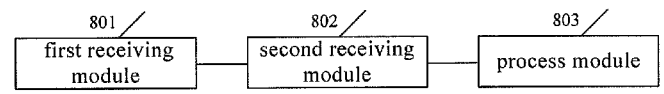

As shown in FIG. 5a5, if carriers CC1, CC2, CC3 are carriers in activated state, when a deactivation control signaling for CC1 is received by the UE, if the UE is going to measure CC1 in deactivated state, it can be measured according to configuration information of the BS and the UE. For example, as shown in FIG. 5a6, a gap can be initiated on RF2 to measure CC1; as shown in FIG. 5a7; the central frequency of RF1 can be shifted from A to B to measure CC1; as shown in FIG. 5a8, a gap can also be initiated on RF1 to measure CC1.

507. The UE receives an activation control signaling sent from the BS for a carrier in deactivated state that is being measured.

508. The UE terminates the measurement of the carrier in deactivated state.

At step 506, if the UE has initiated a gap to measure the carrier in deactivated state, the gap has to be closed at first, and then the measurement of the carrier in deactivated state can be terminated; if the UE has shifted a central frequency to measure the carrier in deactivated state, the measurement of the carrier in deactivated state can be terminated directly; if the UE has enabled an idle RF channel to measure the carrier in deactivated state, the UE must disable the idle RF channel and then terminate the measurement of the carrier in deactivated state.

In the embodiment of this invention, the UE receives a configuration mode that does not take effect immediately; when a deactivation control signaling for a carrier is received by the UE or when a carrier timer of the UE expires, the UE selects an RF channel corresponding to one or more carriers in activated state to initiate a gap, or shifts an RF central frequency, or selects an idle RF channel corresponding to one or more carriers in activated state, to measure one or more deactivated carriers as selected measuring objects. When an activation control signaling for a carrier in deactivated state that is being measured is received by the UE, the UE terminates the measurement of the carrier in deactivated state, so that through controllable deactivated carrier measurement, the UE can reduce terminal battery power consumption and improve system performance.

FIG. 6 is a schematic diagram of a flow of a method for measuring a carrier in deactivated state according to another embodiment of this invention, in which according to configuration information of carriers of a UE, the UE selects measurement configuration information corresponding to the configuration information from a set of measurement configuration information to measure carriers in deactivated state, comprising the following steps.

601. The UE sends RF capability information of the UE to a base station.

Wherein, at step 601, the UE sends to BS RF capability in a band of a configured carrier only if there are at least two RF channels in the band.

The UE sends its RF capability in the same band to the base station, comprising:

sending, by the UE, its RF capability information in the same band to the base station. For example, the capability information can be UE-EUTRA-Capability, wherein the RF capability information of the UE may comprise a number of RF channels that can be supported in the band and receiving bandwidth supported by each RF, wherein the receiving bandwidth can be a maximum receiving bandwidth.

The RF capability in the band may further comprise receiving bandwidth supported in the band, the receiving bandwidth is a bandwidth in which the UE can receive data and/or measure bandwidth simultaneously when all RF channels are enabled; the receiving bandwidth and/or measurement bandwidth can be a maximum bandwidth.

If the RF capability in the same band supports the same receiving bandwidth, the RF capability information in the same band can only comprise the number of RF channels supported in the band.

The RF capability in the band may further comprise receiving bandwidth supported in the band, the receiving bandwidth is a bandwidth in which the UE can receive data and/or measure bandwidth simultaneously when all RF channels are enabled; the receiving bandwidth and/or measurement bandwidth can be a maximum bandwidth.

For different frequency bands, the UE must use several RF channels. However, for multiple frequencies in the same band, for example, the 3.5G frequency band, a total 5 carriers are supported in 100M; if the UE has a main carrier and auxiliary carriers in one band, the UE may have multiple RF channels, and a deactivated auxiliary carrier can be measured without a gap.

602. The BS sends to UE a configuration message with a configuration mode that does not take effect immediately, wherein the configuration message may carry a set of measurement configuration information.

As shown in Table 2, measurement configuration information set 1 comprises:

TABLE 1

| No. | Deactivated CC | Activated CC | Measurement Configuration Information |
|---|---|---|---|
| 1 | CC1 | CC2, CC3, CC4 | Initiate a gap on RF3 |
| 2 | CC2 | CC1, CC3, CC4 | Initiate a gap on RF2 |
| 3 | CC3 | CC1, CC2, CC4 | Initiate a gap on RF2 |
| 4 | CC4 | CC1, CC2, CC3 | Initiate a gap on RF1 |
| 5 | CC1, CC2 | CC3, CC4 | Initiate a gap on RF3 to measure CC1, initiate a gap on RF2 to measure CC2 |
| 6 | CC1, CC3 | CC2, CC4 | Initiate a gap on RF3 to measure CC1, initiate a gap on RF2 to measure CC3 |
| 7 | CC1, CC4 | CC2, CC3 | enable RF1 to measure CC1, CC4 |
| 8 | CC2, CC3 | CC1, CC4 | enable RF3 to measure CC2, CC3 |
| 9 | CC2, CC4 | CC1, CC3 | Initiate a gap on RF1 to measure CC4, initiate a gap on RF2 to measure CC2 |
| 10 | CC3, CC4 | CC2, CC3 | enable RF1 to measure CC1, and initiate a gap to measure CC4 |
| 11 | CC1, CC2, CC3 | CC4 | enable RF2 to measure CC2, CC3, and initiate a gap on RF3 to measure CC1 |
| 12 | CC2, CC3, CC4 | CC1 | enable RF2 to measure CC2, CC3, and initiate a gap on RF1 to measure CC4 |
| 13 | CC1, CC3, CC4 | CC2 | enable RF1 to measure CC1, and initiate a gap to measure CC4; initiate a gap on RF2 to measure CC3 |
| 14 | CC1, CC2, CC4 | CC3 | enable RF3 to measure CC4, and initiate a gap to measure CC1; initiate a gap on RF2 to measure CC2 |

Figure 6A:
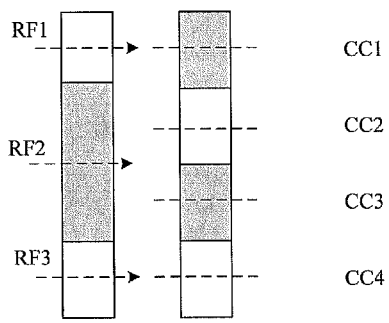
FIG. 6a is a schematic diagram of a flow of a method for measuring a carrier in deactivated state according to another embodiment of this invention.

As shown in FIG. 6a, carriers CC1 and CC4 correspond to RF1 and RF3, respectively, CC2 and CC3 share RF2, for example, when CC2 is a carrier in deactivated state, and CC1, CC3, CC4 are carriers in activated state, Table 2 is measurement configuration information set 2, the UE can select No.2 configuration information from the measurement configuration information set 2 according to configuration information of current configured activated or deactivated carriers, that is, to measure CC2 through shifting central frequency of RF2.

For example, the measurement configuration information set 2 comprises:

TABLE 2

| No. | Deactivated CC | Activated CC | Measurement configuration information |
|---|---|---|---|
| 1 | CC1 | CC2, CC3, CC4 | Initiate a gap on RF3 |
| 2 | CC2 | CC1, CC3, CC4 | Shift the central frequency of RF2 |
| 3 | CC3 | CC1, CC2, CC4 | Shift the central frequency of RF2 |
| 4 | CC4 | CC1, CC2, CC3 | Initiate a gap on RF1 |
| 5 | CC1, CC2 | CC3, CC4 | Initiate a gap on RF3 to measure CC1; Shift the central frequency of RF2 to measure CC2 |
| 6 | CC1, CC3 | CC2, CC4 | Initiate a gap on RF3 to measure CC1; Shift central frequency of RF2 to measure CC3 |
| 7 | CC1, CC4 | CC2, CC3 | Enable RF1 to measure CC1, CC4 |
| 8 | CC2, CC3 | CC1, CC4 | Enable RF3 to measure CC2, CC3 |
| 9 | CC2, CC4 | CC1, CC3 | Initiate a gap on RF1 to measure CC4; Shift central frequency of RF2 to measure CC2 |
| 10 | CC3, CC4 | CC2, CC3 | Enable RF1 to measure CC1, and initiate a gap to measure CC4 |
| 11 | CC1, CC2, CC3 | CC4 | Enable RF2 to measure CC2, CC3, and initiate a gap on RF3 to measure CC1 |
| 12 | CC2, CC3, CC4 | CC1 | Enable RF2 to measure CC2, CC3, and initiate a gap on RF1 to measure CC4 |
| 13 | CC1, CC3, CC4 | CC2 | Enable RF1 to measure CC1, and initiate a gap to measure CC4; Shift central frequency of RF2 to measure CC3 |
| 14 | CC1, CC2, CC4 | CC3 | Enable RF3 to measure CC4, and initiate a gap to measure CC1; Shift the central frequency of RF2 to measure CC2 |

603. The UE stores the configuration message carrying configuration mode that does not take effect immediately.

604. The UE receives a deactivation control signaling for a carrier sent from the base station.

605. The UE receives a deactivation control signaling for at least one carrier; switches the at least one carrier from activated state to deactivated state; selects measurement configuration information corresponding to the UE configuration information from the measurement configuration information set to measure the carrier in deactivated state.

The control signaling can be Medium Access Control (Medium Access Control,MAC) signaling or a physical layer control signaling.

606. The UE receives an activation control signaling for a carrier in deactivated state that is being measured from the BS.

607. The UE terminates measurement of the carrier in deactivated state.

At step 605, if the UE has initiated a gap to measure the carrier in deactivated state, the gap has to be closed at first, and then the measurement of the carrier in deactivated state can be terminated; if the UE has shifted a central frequency to measure the carrier in deactivated state, the measurement of the carrier in deactivated state can be terminated directly; if the UE has initiated an idle RF channel to measure the carrier in deactivated state, the UE needs to close the idle RF channel and then terminate the measurement of the carrier in deactivated state.

FIG. 7 is a schematic diagram of a flow of a method for measuring a carrier in deactivated state according to another embodiment of this invention, comprising:

701. A base station sends a configuration mode that does not take effect immediately;

701a. The BS sends a deactivation control signaling to UE to cause the UE to switch a carrier from activated state to deactivated state when receiving the carrier deactivation control signaling, and measure the carrier in deactivated state; or 702b. The BS sends an activation control signaling for a carrier in deactivated state that is being measured to the UE, to cause the UE to terminate the measurement of the carrier in deactivated state.

In the embodiment of this invention, a BS sends a configuration mode that does not take effect immediately to a UE, to cause the UE to receive a deactivation control signaling for a carrier or a timeout notification of a carrier timer of the UE, switch the carrier from activated state to deactivated state, and measure the carrier in deactivated state; or to cause the UE to terminate measurement of the carrier in deactivated state if an activation control signaling for a carrier in deactivated state that is being measured is received by the UE. Through controllable deactivated carrier measurement, the UE can reduce terminal battery power consumption and improve system performance.

Figure 8A:
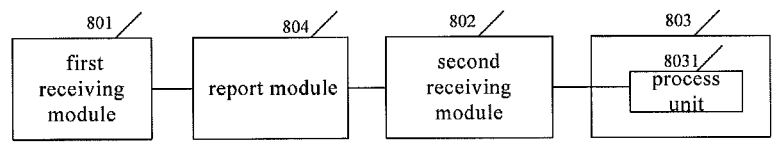
FIG. 8a is another schematic structure diagram of an apparatus for measuring a carrier in deactivated state of this invention.

FIG. 8 is a schematic structure diagram of an apparatus for measuring a carrier in deactivated state according to an embodiment of this invention, comprising:

a first receiving module 801 for receiving a configuration mode that does not take effect immediately;

a second receiving module 802 for receiving a deactivation control signaling for a carrier or a timeout notification of a carrier timer, or receiving an activation control signaling for a carrier in deactivated state that is being measured;

a process module 803 for when a deactivation control signaling or a timeout notification is received by the second receiving module, switching the carrier from activated state to deactivated state, and measuring the carrier in deactivated state; or when an activation control signaling for a carrier in deactivated state is received by the second receiving module, terminating measurement of the carrier in deactivated state, wherein, when a deactivation control signaling or a timeout notification of a carrier of the UE is received by the second receiving module, the carrier is switched from activated state to deactivated state, as shown in FIG. 8a, the process module is particularly used to:

initiate a gap to measure the carrier in deactivated state;

if each of configured carriers corresponds to an RF channel, according to RF capability, initiate a gap on an enabled RF to measure the carrier in deactivated state;

if each of configured carriers corresponds to an RF channel, according to RF capability of the UE, enable an RF channel corresponding to the carrier in deactivated state to perform measurement;

if at least two configured carriers share an RF channel, according to RF capability of the UE, shift central frequency of the RF channel to measure the carrier in deactivated state;

if at least two configured carriers corresponds ton a RF channel, according to RF capability of the UE, initiate a gap on an enable RF channel to measure the carrier in deactivated state;

according to the RF capability, select an RF channel corresponding to one or more carriers in activated state to measure carriers in deactivated state by measuring manner.

Furthermore, the process module is used to, according to the RF capability, select an RF channel corresponding to one or more carriers in activated state to measure the carriers in deactivated state by measuring manner. The process module further comprises a process unit 8031 for performing non-repeated measurement on at least one carrier in deactivated state on an RF channel corresponding to at least one carrier in activated state during one measurement period.

Furthermore, the apparatus further comprises:

a reporting module 804 for reporting RF capability information of the UE, wherein the RF capability information comprises a number of RF channels that are supported in a band of the UE and receiving bandwidth supported by each RF channel; or if RF capability in the same band supports the same receiving bandwidth, the RF capability information of the same band only comprises the number of RF channels supported in the band; or the RF capability information of the band comprises receiving bandwidth supported in the band, that is, receiving bandwidths in which the UE receives data and/or measures bandwidth simultaneously when all RFs are enabled, wherein, the first receiving module is particularly used to receive a configuration message carrying a configuration mode that does not take effect immediately and a measurement information set, when the second receiving module receives a deactivation control signaling for a carrier or a timeout notification of a carrier timer of the UE, the carrier is switched from activated state to deactivated state; the process module is particularly used to receive a deactivation control signaling for at least one carrier, switch the at least one carrier from activated state to deactivated state; the UE selects measurement configuration information corresponding to the carrier configuration information of the UE from the measurement configuration set according to the carrier configuration information of the UE, to measure the carrier in deactivated state.

In the embodiment of this invention, a user terminal UE receives a configuration mode that does not take effect immediately, if a deactivation control signaling for a carrier or a timeout notification of a carrier timer of the UE is received by the UE, the carrier is switched from activated state to deactivated state, and the UE measures the carrier in deactivated state; or if an activation control signaling for a carrier in deactivated state that is being measured is received by the UE, the UE terminates measurement of the carrier in deactivated state. Through controllable deactivated carrier measurement, the UE can reduce terminal battery power consumption and improve system performance.

Figure 9:
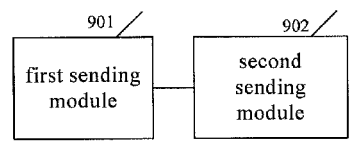
FIG. 9 is a schematic structure diagram of a base station of this invention.

FIG. 9 is a schematic structure diagram of a base station of this invention, comprising:

a first sending module 901 for sending a configuration mode that does not take effect immediately;

a second sending module 902 for sending a deactivation control signaling to a UE to cause the UE to switch a carrier from activated state to deactivated state when receiving the deactivation control signaling for the carrier, and measure the carrier in deactivated state; or for sending the UE an activation control signaling for a carrier in deactivated state that is being measured, to cause the UE to terminate measurement of the carrier in deactivated state, wherein, the first sending module is particularly used to send configuration information carrying a configuration mode that does not take effect immediately and a measurement information set.

In the embodiment of this invention, the BS sends a configuration mode that does not take effect immediately to a user terminal UE; the BS sends a deactivation control signaling for a carrier to the UE, to cause the UE to switch the carrier from activated state to deactivated state when receiving the deactivation control signaling for the carrier, and measure the carrier in deactivated state; or the BS sends an activation control signaling for a carrier in deactivated state that is being measured to the UE, to cause the UE to switch the carrier from activated state to deactivated state when receiving the deactivation control signaling for the carrier, and measure the carrier in deactivated state. Through controlling deactivated carrier measurement, the UE can reduce terminal battery power consumption and improve system performance.

The apparatus of the embodiment of this invention is used to perform steps of methods of above embodiments.

Embodiments of this invention have been described with three or four carriers as an example. However, embodiments of this invention are not limited to the carrier number specified in above embodiments.

Through the description of various embodiments above, those skilled in the art can clearly understand that the invention can be implemented in a manner of software and an essential general-purpose hardware platform. Of course, it can be implemented by hardware, but the former is preferred in most cases. Based upon such understanding, the technical solutions of the invention or a part thereof contributing to the prior art can essentially be embodied in the form of a software product, which can be stored in a storage medium, which includes several instructions to cause a computer device (which may be a personal computer, a server, a network device, etc.) to perform the methods according to the respective embodiments of the invention.

Although this invention has been illustrated and described with reference to some preferred embodiments of this invention, those skilled in the art may understand that various modifications in the form and details can be made without departing from the spirit and scope of this invention.

What is claimed is:

1. A method for measuring a carrier in deactivated state, comprising:
   receiving, by a base station, radio frequency (RF) capability information of a user equipment (UE) when there are at least two RF channels in a same band, wherein the RF capability information is UE-EUTRA-Capability; and
   sending, by the base station, a configuration message with a configuration mode that does not take effect immediately, wherein the configuration message carries a set of measurement configuration information, wherein the configuration message causes the UE to measure a carrier in deactivated state based on initiating a gap on an enabled RF channel, shifting RF central frequency, or enabling an idle RF channel.

2. The method according to claim 1, wherein the receiving, by the base station, the RF capability information of the UE comprises:
   receiving, by the base station, the RF capability information of the UE in a same band, wherein the RF capability information comprises a number of RF channels that are supported in the same band and receiving bandwidth supported by each RF channel, wherein the receiving bandwidth is a maximum receiving bandwidth.

3. The method according to claim 2, wherein the RF capability information of the UE in the same band further comprises:
   a receiving bandwidth supported in the same band, wherein the receiving bandwidth is a bandwidth in which the UE receives data, and the receiving bandwidth is a maximum bandwidth.

4. The method according to claim 1, wherein the receiving, by the base station, the RF capability information of the UE comprises:

receiving, by the base station, RF capability information of the UE in a same band, wherein the RF capability information only comprises a number of RF channels supported in the same band if the RF capability information in the same band supports a same receiving bandwidth.

5. The method according to claim 4, wherein the RF capability information of the UE in the same band further comprises:
a receiving bandwidth supported in the same band, wherein the receiving bandwidth is a bandwidth in which the UE receives data, and the receiving bandwidth is a maximum bandwidth.

6. A method for measuring a carrier in deactivated state, comprising:
sending, by a user equipment (UE), radio frequency (RF) capability information of the UE when there are at least two RF channels in a same band, wherein the RF capability information is UE-EUTRA-Capability;
receiving, by the UE, a configuration message with a configuration mode that does not take effect immediately, wherein the configuration message carries a set of measurement configuration information; and
measuring, by the UE based on the configuration message, a carrier in deactivated state based on initiating a gap on an enabled RF channel, shifting RF central frequency, or enabling an idle RF channel.

7. The method according to claim 6, wherein the sending, by the UE, the RF capability information of the UE comprises:
sending, by the UE, RF capability information of the UE in a same band, wherein the RF capability information comprises a number of RF channels that are supported in the same band and receiving bandwidth supported by each RF, wherein the receiving bandwidth is a maximum receiving bandwidth.

8. The method according to claim 7, wherein the RF capability information of the UE in a same band further comprises:
a receiving bandwidth supported in the same band, wherein the receiving bandwidth is a bandwidth in which the UE receives data, and the receiving bandwidth is a maximum bandwidth.

9. The method according to claim 6, wherein the sending, by the UE, the RF capability information of the UE comprises:
sending, by the UE, the RF capability information of the UE in a same band, wherein the RF capability information only comprises a number of RF channels supported in the same band if the RF capability information in the same band supports the same receiving bandwidth.

10. The method according to claim 9, wherein the RF capability information of the UE in the same band further comprises:
a receiving bandwidth supported in the same band, wherein the receiving bandwidth is a bandwidth in which the UE receives data, and the receiving bandwidth is a maximum bandwidth.

11. A base station, comprising:
a receiver, configured to receive radio frequency (RF) capability information of a user equipment (UE) when there are at least two RF channels in a same band, wherein the RF capability information is UE-EUTRA-Capability; and
a transmitter, configured to send a configuration message with a configuration mode that does not take effect immediately, wherein the configuration message carries a set of measurement configuration information, wherein the configuration message causes the UE to measure a carrier in deactivated state based on initiating a gap on an enabled RF channel, shifting RF central frequency, or enabling an idle RF channel.

12. The base station according to claim 11, wherein the receiver is further configured to receive the RF capability information of the UE in a same band, wherein the RF capability information comprises a number of RF channels that are supported in the same band and receiving bandwidth supported by each RF, wherein the receiving bandwidth is a maximum receiving bandwidth.

13. The base station according to claim 12, wherein the RF capability information of the UE in the same band further comprises:
a receiving bandwidth supported in the same band, the receiving bandwidth is a bandwidth in which the UE receives data, and the receiving bandwidth is a maximum bandwidth.

14. The base station according to claim 11, wherein the receiver is further configured to receive the RF capability information of the UE in a same band, wherein the RF capability information only comprises a number of RF channels supported in the same band if the RF capability information in the same band supports the same receiving bandwidth.

15. The base station according to claim 14, wherein the RF capability information of the UE in the same band further comprises:
a receiving bandwidth supported in the same band, the receiving bandwidth is a bandwidth in which the UE receives data, and the receiving bandwidth is a maximum bandwidth.

16. A user equipment for measuring a carrier in deactivated state, comprising:
a transmitter, configured to send to a base station radio frequency (RF) capability information of the user equipment when there are at least two RF channels in a same band, wherein the RF capability information is UE-EUTRA-Capability; and
a receiver, configured to receive from the base station a configuration message with a configuration mode that does not take effect immediately, wherein the configuration message carries a set of measurement configuration information, wherein the configuration message causes the user equipment to measure a carrier in deactivated state based on initiating a gap on an enabled RF channel, shifting RF central frequency, or enabling an idle RF channel.

17. The user equipment according to claim 16, wherein the transmitter is further configured to send the RF capability information of the user equipment in a same band, wherein the RF capability information comprises a number of RF channels that are supported in the same band and receiving bandwidth supported by each RF, wherein the receiving bandwidth is a maximum receiving bandwidth.

18. The user equipment according to claim 17, wherein the RF capability information of the user equipment in a same band further comprises:
a receiving bandwidth supported in the same band, the receiving bandwidth is a bandwidth in which the user equipment receives data, and the receiving bandwidth is a maximum bandwidth.

19. The user equipment according to claim 16, wherein the transmitter is further configured to send the RF capability information of the user equipment in a same band, wherein the RF capability information only comprises a number of RF channels supported in the same band if the RF capability information in the same band supports the same receiving bandwidth.

20. The user equipment according to claim 19, wherein the RF capability information of the user equipment in a same band further comprises:
a receiving bandwidth supported in the same band, the receiving bandwidth is bandwidth in which the user equipment receives data, and the receiving bandwidth is a maximum bandwidth.

* * * * *

UNITED STATES PATENT AND TRADEMARK OFFICE
CERTIFICATE OF CORRECTION

PATENT NO. : 10,009,843 B2
APPLICATION NO. : 14/695889
DATED : June 26, 2018
INVENTOR(S) : Chai et al.

It is certified that error appears in the above-identified patent and that said Letters Patent is hereby corrected as shown below:

Page 2, Item (56), References Cited, Foreign Patent Documents, "WO WO 2011041662 A1" should read -- WO 2011041662 A1 --.

Signed and Sealed this
Second Day of October, 2018

Andrei Iancu
*Director of the United States Patent and Trademark Office*